United States Patent
Shapiro

(10) Patent No.: US 6,363,697 B1
(45) Date of Patent: Apr. 2, 2002

(54) FOAL WEANING GEAR

(76) Inventor: Richard Allen Shapiro, 11632 Hickory Grove Church Rd., Raleigh, NC (US) 27613

( * ) Notice: Subject to any disclaimer, the term of this patent is extended or adjusted under 35 U.S.C. 154(b) by 0 days.

(21) Appl. No.: 09/724,757

(22) Filed: Nov. 30, 2000

(51) Int. Cl.[7] .............................. B68C 1/00; B68C 5/00; A01K 13/00
(52) U.S. Cl. .............................. 54/23; 54/79.2; 119/852
(58) Field of Search .............................. 54/23, 78, 79.1, 54/79.2; 119/821, 811, 852, 854, 868

(56) References Cited

U.S. PATENT DOCUMENTS

| | | | |
|---|---|---|---|
| 455,618 A | 7/1891 | Helm | 119/852 |
| 486,766 A | 11/1892 | Chase | 119/852 |
| 502,508 A * | 8/1893 | Cleveland et al. | 54/79.2 |
| 791,372 A * | 5/1905 | Seaders | 54/79.2 |
| 1,114,632 A | 10/1914 | Nary | 119/852 |
| 1,251,886 A | 1/1918 | Hawkins | 119/852 |
| 1,549,598 A * | 8/1925 | Millsap | 119/852 |
| 1,663,408 A | 3/1928 | Jenkins | 119/852 |
| 1,848,586 A | 3/1932 | Thompson | 119/852 |
| 2,523,820 A | 9/1950 | Cox | 119/852 |
| 4,141,197 A * | 2/1979 | Nichols | 54/78 |
| 4,290,386 A * | 9/1981 | Eiriksson | 119/868 |
| 6,098,383 A * | 8/2000 | Napier | 54/23 |

* cited by examiner

*Primary Examiner*—Peter M. Poon
*Assistant Examiner*—Elizabeth Shaw
(74) *Attorney, Agent, or Firm*—Mills Law Firm PLLC

(57) ABSTRACT

A foal weaning gear for wear by a nursing mare to deny access by a foal includes a protective pad disposed over the mammary glands and resiliently held in position by a plurality of adjustable straps providing continuous triaxial resilient biasing of the protective pad throughout normal physical activities of the mare without requiring ongoing adjustment during the weaning period.

10 Claims, 4 Drawing Sheets

FOAL WEANING GEAR

FIELD OF THE INVENTION

The present invention relates to devices for weaning nursing animals, and, in particular, a weaning device worn by a mare for weaning a foal from physical and emotional dependency.

BACKGROUND OF THE INVENTION

Young animals during initial stages of development require ready access to the mammary glands of the parent and acquire a physical and emotional dependency thereon. After such initial growth, however, it is desirable to wean the young animal from such dependency. The procedure is difficult and often traumatic occasionally resulting in physical as well as emotional damage to the foal. While certain gear has been proposed for physically denying access, the approaches have generally been unsatisfactory for foals and mares inasmuch as the bonds regarding nursing are strong, and the daily physical activities, running and frolicking, readily dislodge proposed restraining gear. Accordingly, physical separation of the foal from the mare until weaning is effected is still the most commonly used technique. Such separation results in extreme anguish for both the mare and foal.

Numerous types of weaning gear have been proposed for other nursing animals, particularly cattle. For instance, U.S. Pat. No. 486,766 to Chase discloses a protective udder bag for cows for preventing undesired access by a calf. Various leather belts are coupled to the bag for retention. The leather materials are prone to loosening due to realignment in normal environments requiring continuing adjustment.

A similar approach is disclosed in U.S. Pat. No. 1,114,632 to N wherein leather straps support the front and rear of the covering bag. The disposition of the retaining harness would not be effective for maintaining position during rolling and other activities uniquely favored by horses. Further like devices are disclosed in U.S. Pat. Nos. 2,523,820 to Cox, 1,633,4068 to Jenkins, 1,848,586 to Thompson, and 455,618 to Helm.

U.S. Pat. No. 1,251,886 to Hawkins discloses a foal weaner wherein a harness worn by a mare includes a plurality of leather straps for maintaining position of the protective pad. The straps tend to reposition in use and must be frequently retightened to prevent dislodging.

Accordingly a need continues to exist for weaning gear, particularly adapted to the needs of mares and foals, that is readily positioned on the mare for effectively limiting access by the foals, and maintains position without the need for adjustment during normal activities of the mare until weaning of the foal is effected.

SUMMARY OF THE INVENTION

The foregoing needs are accomplished in accordance with the present invention by a foal weaning gear that is readily attached in position on the mare and resiliently withstands environmental and physical conditions of use without dislodging. The foal weaning gear includes an absorbent protective pad that conforms to the mammary anatomy of the mare and is resiliently triaxially biased into comfortable and secure position by an encircling adjustable girth belt wrapped forwardly of the rear legs and a pair of elastic tethering straps diverging rearwardly from the top of the girth belt over the back of the mare and attached to the rear corners of the protective pad providing rearward and upward biasing. A loose fitting padded collar is disposed over the neck of the mare. An elastic back strap extends along the back of the mare and interconnects the collar with the top of the girth belt providing a continuous forward biasing on the girth belt and tethering straps to maintain position of the protective pad notwithstanding normal movement activities of the mare. The back strap also flexes to accommodate normal neck movement for the mare without undue restraint. Elastic flank straps, extending along the rear legs between the girth belt and the tethering straps, provide lateral biasing for maintaining pad position during normal frolicking and rolling activities. The weaning gear thus provides affirmative positioning of the protective pad without adjustment over extended periods thereby denying access to the foal and effectively weaning the foal quickly and without physical or emotional trauma.

Accordingly, it is an object of the invention to provide a weaning gear for a mare that may be used for denying access to a foal without supplemental adjustment.

Another object of the invention is to provide a foal weaning gear that may be readily secured to a nursing mare and does not interfere with normal physical activities.

A further object of the invention is to provide a readily secured comfortable wearing gear for a nursing mare that remains in position throughout the weaning period and withstands environmental conditions without adjustment.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
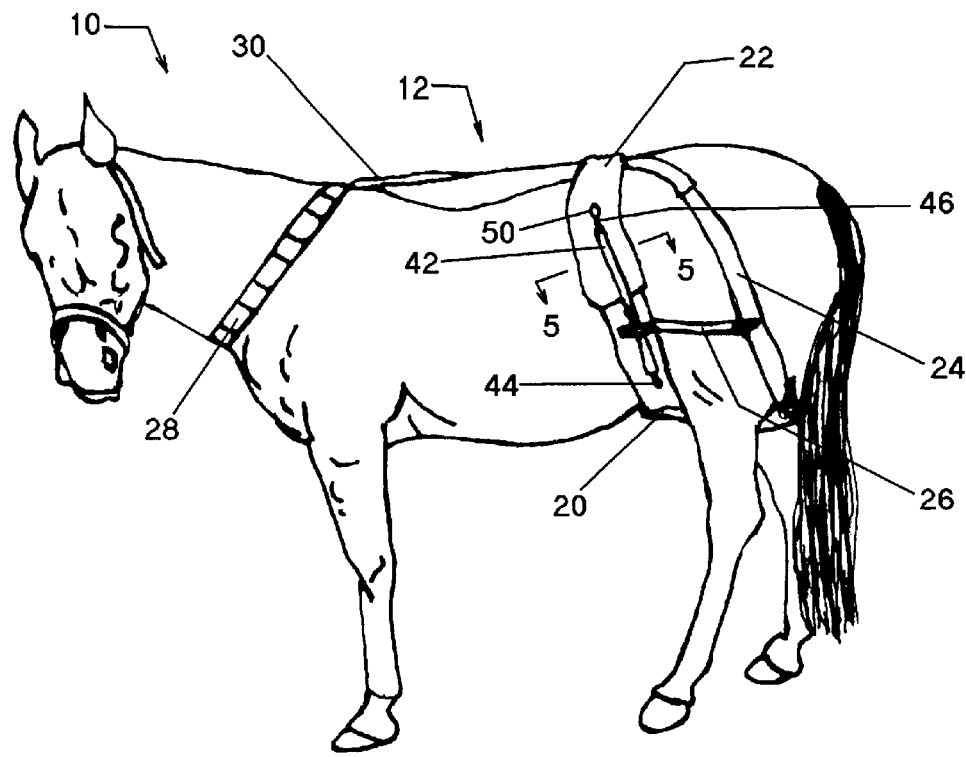
FIG. 1 is a side elevational view of a mare provided with foal weaning gear in accordance with the invention.
Figure 2:
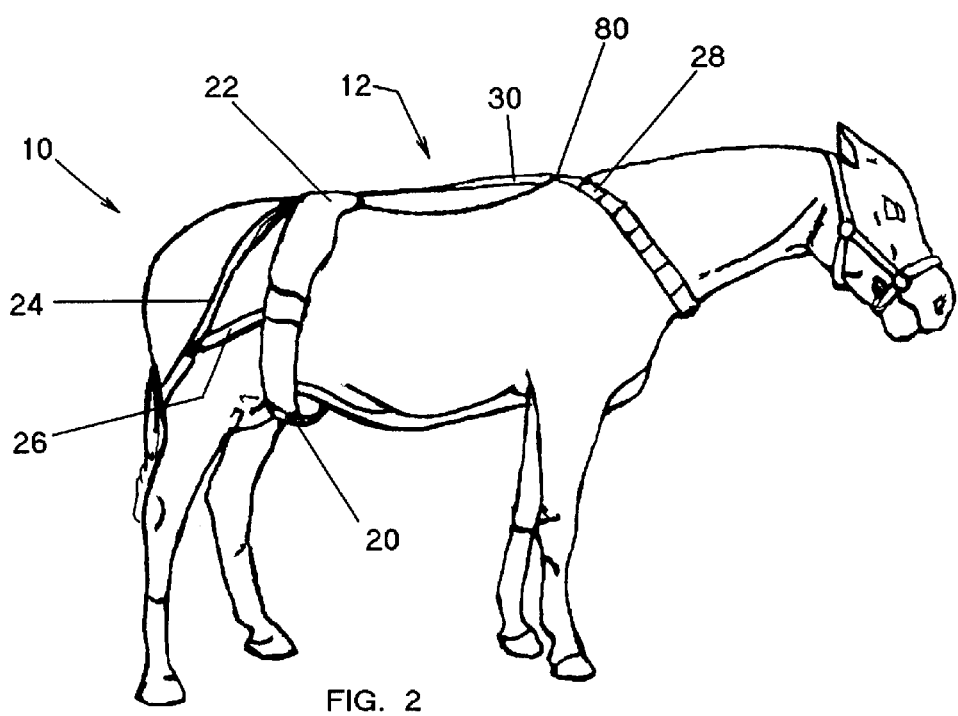
FIG. 2 is an opposed side elevational view of the foal weaning gear.

Referring to the drawings for the purpose of describing the preferred embodiment and not for limiting same, FIGS. 1 and 2 illustrate a mare 10 provided with a foal weaning gear 12 in accordance with a preferred embodiment of the invention. As hereinafter described in detail, the weaning gear 12 covers the mammary glands of the mare for assisting in weaning a nursing foal.

The weaning gear 12 comprises a lower protective pad 20 secured to the back of the mare 10 by girth belt 22, a pair of tether straps 24 and flank straps 26. The girth belt 22 is resiliently connected to a collar 28 by an elastic back strap 30.

The protective pad 20 is formed of a woven absorbent material and has a front end stitched to the lower portion of the girth belt 22 and the corners of the rear end stitched to the rear ends of the tether straps 24. The protective pad has curved sides, such that the protective pad 20 in use overlies and conforms to the mammary anatomy of the mare 10.

Figure 5:
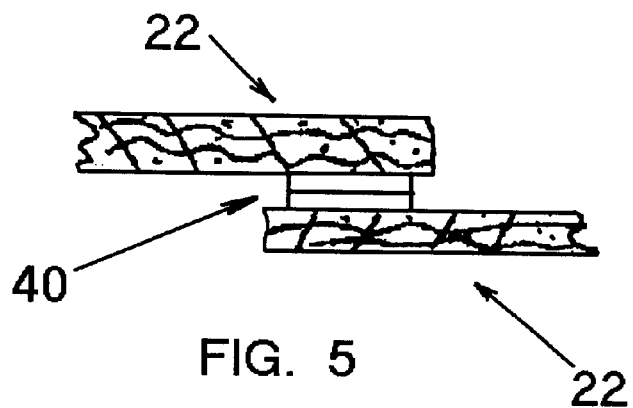
FIG. 5 is an enlarged cross sectional view taken along line 5—5 in FIG. 1.
Figure 8:
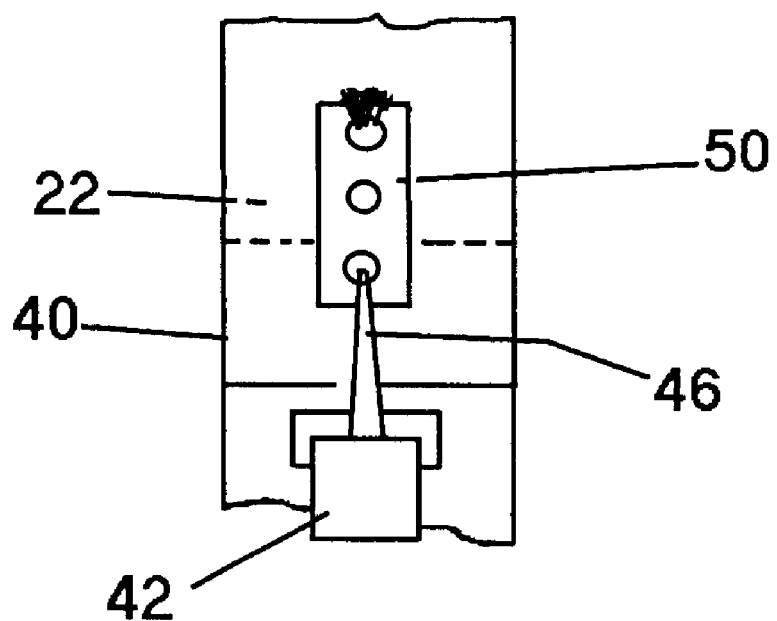
FIG. 8 is an enlarged side view showing the adjustment strap for the girth belt.

The girth belt 22 is an elongated member of sufficient length to encircle the mare forwardly of the rear legs. The girth belt 22 is formed of a natural or synthetic padded material such as a fleece, comfortable when worn and resistant to environmental damage. The overall length of the girth belt 22 is slightly longer than the contact area on the mare to accommodate varying sized mares. As shown in FIG. 5, the ends of the girth belt 22 are provided with engagable hook and eye fastening strips 40 for facilitating preliminary alignment on the mare. As also shown in FIG. 8, an adjustment strap 42 is attached at a lower end 44 to the lower section of the girth belt 22 and carries a snap hook 46 at the upper end 48 that is releasably connected to an apertured connecting member 50 attached to the girth belt 22 on the opposite side of the fastening strips 40. Accordingly, the effective length of the adjustment strap 42 may be adjusted to provide a comfortable, secure mounting of the girth belt 22 on the mare.

Figure 3:
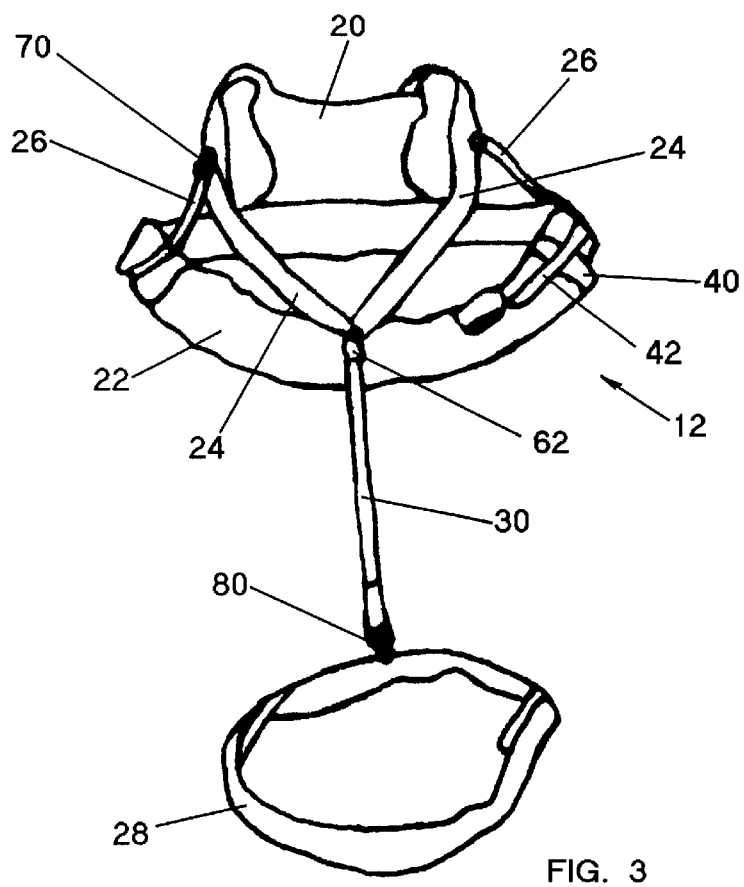
FIG. 3 is a plan view of the foal weaning gear in the assembled condition removed from the mare.
Figure 4:
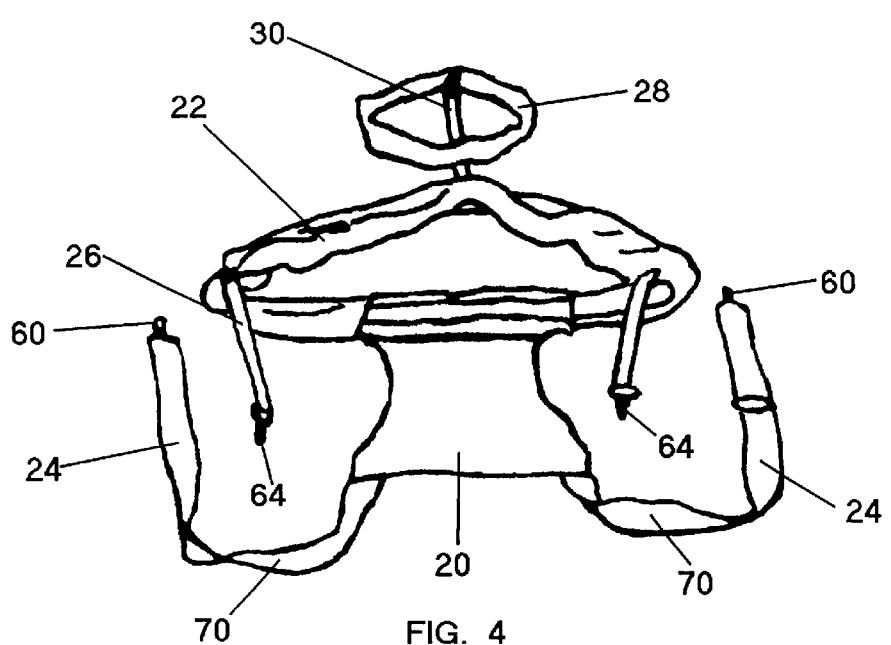
FIG. 4 is a plan view of the foal weaning gear in a partially unassembled condition.
Figure 6:
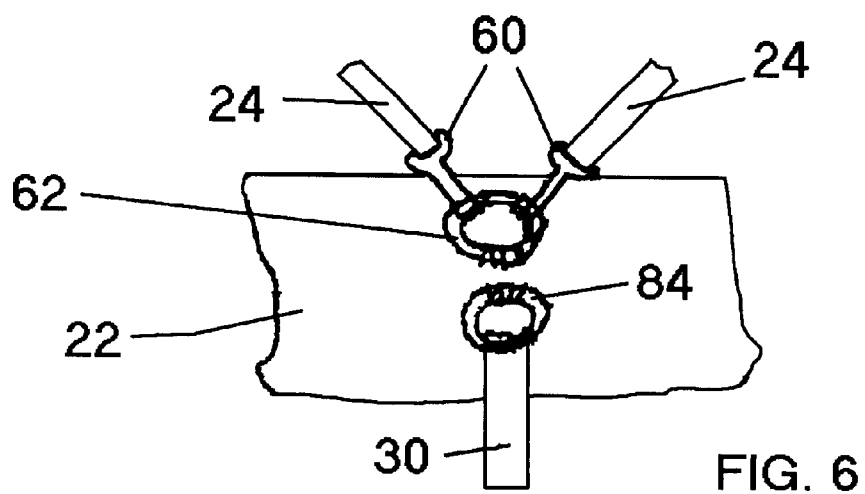
FIG. 6 is an enlarged top view of the girth belt illustrating the connections with the tethering straps and back strap.

Referring additionally to FIGS. 3 and 4, the tether straps 24 are a sliding buckle adjustable construction of material. The tether straps 24 have lower ends respectively connected to the rear outer corners of the pad 20 and carry snap hook fasteners 60 at the opposite ends. The fasteners 60 are connected to a fastener loop 62 attached to the top center of the girth belt 22 for securing the pad 20 in position (FIG. 6).

Figure 7:
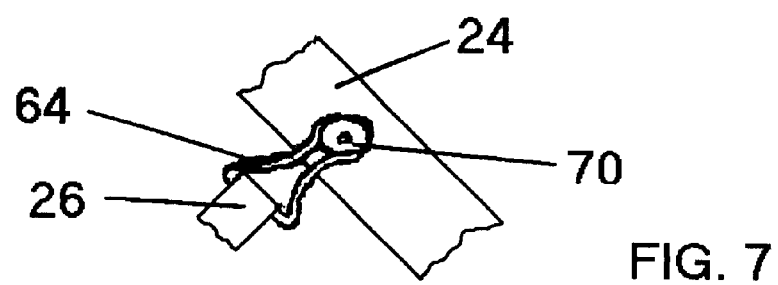
FIG. 7 is an enlarged side view showing the attachment of the flank strap to the tethering strap.

The flank straps 26 have an adjustable sliding buckle and are of elastic construction and are attached at forward ends to the sides of the girth belt and include garter-type fasteners 64 at the rearward ends that are connected with a button 70 attached to the midsection of the tether straps 24 (FIG. 7). The flank straps 26 may be adjusted to resiliently tension the tether straps 24 to maintain a continuous biasing on the pad, notwithstanding normal activities of the mare.

Figure 9:
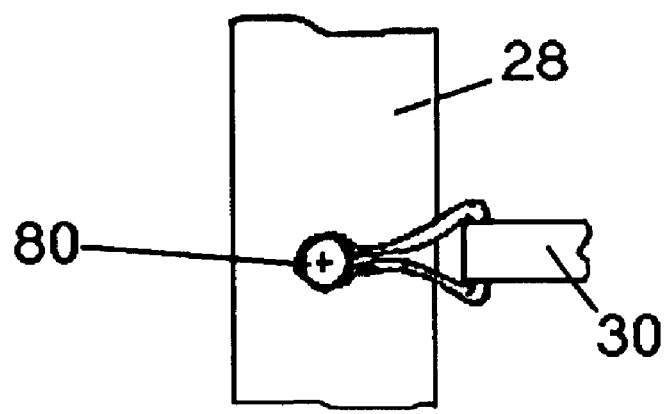
FIG. 9 is an enlarged top view showing the attachment between the collar and the back strap.

The collar 28 is an elongated padded member adapted to loosely encircle the neck of the mare adjacent the forelegs. The collar 28 may be formed in a continuous loop or have the ends thereof interconnected by releasable fasteners, such as hook and loop fasteners. The collar 28 carries a button 80 on the top surface engaged by a garter-type fastener 82 on the back strap 30 (FIG. 9).

The back strap 30 is also a sliding buckle adjustable and elastic construction having a looped rear end threaded through a loop fastener 84 connected at the top center of the girth belt 22 and having a garter-type fastener 82 at the front end connected with the retaining button 80 on the collar 28. The back strap 30 provides continuous forward biasing of the girth belt 22 to maintain positioning of the protective pad 20 while accommodating full neck movement during movement and feeding.

The above described weaning gear 12 is mounted by initially disconnecting the various straps, opening the girth belt 22 and approximately positioning the latter on the back of the mare. The hook and loop fastening strips 40 are secured to loosely position the girth belt 22. The tether straps 24 and the pad are pulled rearwardly between the rear legs and the free ends hooked with fasteners 60 to the attachment loop 62 on the girth belt 22 for positioning the protective pad 20 in conformity with the mammary gland. The buckles on the tether straps 24 are adjusted as required to provide an affirmative comfortable fit. The collar 28 is then disposed over the neck and the back strap 30 connected between the collar 28 and the girth belt 22. The length of the back strap 30 is likewise adjusted for affirmative and comfortable biasing. After achieving the initial fitting, the flank straps 26 are attached and adjusted to provide secure lateral positioning of the pad during normal activities.

The weaning gear 12 is preferably worn continuously until effective weaning of the foal has been achieved. In actual use, the weaning gear has been demonstrated to provide rapid weaning with minimal physical and emotional anguish to the foal enabling the foal to remain in desired proximity with the mare throughout the weaning period. After weaning is completed, the weaning gear is removed and conventionally washed prior to subsequent use.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed:

1. A foal weaning gear for a mare comprising: a girth belt for encircling the mare forwardly of the rear legs of the mare and including adjustment means for controlling the conformal fit with the mare; a protective pad conformal to the mammary glands of the mare and attached at the forward edge to a lower portion of said girth belt; first and second tethering straps having upper ends connected at a top portion of said girth belt and lower ends attached to opposed rear corners of said protective pad; a collar having a center opening for disposition over the neck of the mare adjacent the front legs; an elastic back strap attached at a forward end to said collar adjacent the top thereof and attached at a rearward end to said girth belt adjacent said upper ends of said tethering straps; and elastic flank straps extending between the sides of said girth belt and a midportion of said tethering straps for providing lateral biasing and restraint of said tethering straps.

2. The foal weaning gear as recited in claim 1 wherein said protective pad is formed of an absorbent material and includes curved sides conformal with the inner surfaces of the rear legs of said mare.

3. The foal weaning gear as recited in claim 2 wherein said girth belt is formed of a padded material.

4. The foal weaning gear as recited in claim 3 wherein said girth belt is an elongated member and includes fastener means at the ends for establishing an opening for loose disposition on the mare and said adjustment means bridges said ends for reducing the effective size of said opening for conformal adjustment on said mare.

5. The foal weaning gear as recited in claim 4 wherein said collar is formed of a padded material.

6. The foal weaning gear as recited in claim 5 wherein said back strap has an adjustable length for controlling biasing between said girth belt and said collar.

7. The foal weaning gear as recited in claim 6 wherein said flank straps have an adjustable length for controlling biasing between said girth belt and said tethering straps.

8. The foal weaning gear as recited in claim 7 wherein said flank straps are releasably attachable with said tethering straps.

9. The foal weaning gear as recited in claim 6 wherein said tethering straps are releasably attachable with said girth belt.

10. The foal weaning gear as recited in claim 9 wherein said tethering straps have an adjustable length for controlling biasing between said girth belt and said protective pad.

* * * * *